United States Patent
Wang et al.

(10) Patent No.: US 10,698,268 B2
(45) Date of Patent: Jun. 30, 2020

(54) LIQUID CRYSTAL LENS, MANUFACTURING METHOD THEREOF AND CURVED DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Lei Wang, Beijing (CN); Xiaochuan Chen, Beijing (CN); Wenqing Zhao, Beijing (CN); Qian Wang, Beijing (CN); Rui Xu, Beijing (CN); Ming Yang, Beijing (CN); Jian Gao, Beijing (CN); Pengcheng Lu, Beijing (CN); Xiaochen Niu, Beijing (CN); Changfeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/541,375

(22) PCT Filed: Jan. 10, 2017

(86) PCT No.: PCT/CN2017/070732
§ 371 (c)(1),
(2) Date: Jul. 2, 2017

(87) PCT Pub. No.: WO2017/166899
PCT Pub. Date: Oct. 5, 2017

(65) Prior Publication Data
US 2018/0203268 A1    Jul. 19, 2018

(30) Foreign Application Priority Data

Apr. 1, 2016 (CN) .......................... 2016 1 0202960

(51) Int. Cl.
*G02F 1/1335* (2006.01)
*G02F 1/1343* (2006.01)
(Continued)

(52) U.S. Cl.
CPC .......... *G02F 1/1343* (2013.01); *G02F 1/0311* (2013.01); *G02F 1/13306* (2013.01);
(Continued)

(58) Field of Classification Search
CPC .................................................... G06F 1/1637
See application file for complete search history.

(56) References Cited

U.S. PATENT DOCUMENTS 4,572,616 A    2/1986   Kowel et al.
6,859,333 B1   2/2005   Ren et al.
(Continued)

FOREIGN PATENT DOCUMENTS

CN    102279500       12/2011
CN    102305984 A     1/2012
(Continued)

OTHER PUBLICATIONS

International Search Report for PCT Application No. PCT/CN2017/070732 dated Mar. 28, 2017.
First Office Action for Chinese Patent Application No. 201610202960.5 dated Dec. 5, 2017.

*Primary Examiner* — Nan-Ying Yang
(74) *Attorney, Agent, or Firm* — Calfee, Halter & Griswold LLP

(57) ABSTRACT

A liquid crystal lens, a manufacturing method and a corresponding curved display device are disclosed. The liquid crystal lens is configured to be adhered over a flat display (Continued)

device for achieving curved display, and includes liquid crystals, a first electrode and a second electrode for driving the liquid crystals, and an elevation layer. The first electrode includes a plurality of independent electrodes separate from each other, each independent electrode being arranged on the elevation layer. The elevation layer is further configured such that each independent electrode is located in a different position along a thickness direction of the elevation layer.

12 Claims, 3 Drawing Sheets

(51) Int. Cl.
*G02F 1/29* (2006.01)
*G02F 1/1347* (2006.01)
*G02F 1/03* (2006.01)
*G02F 1/133* (2006.01)
*G09G 3/00* (2006.01)
*G09G 3/36* (2006.01)

(52) U.S. Cl.
CPC ............ *G02F 1/13471* (2013.01); *G02F 1/29* (2013.01); *G02F 2001/294* (2013.01); *G09G 3/003* (2013.01); *G09G 3/36* (2013.01); *G09G 2300/023* (2013.01)

(56) References Cited

U.S. PATENT DOCUMENTS

| | | | |
|---|---|---|---|
| 2002/0125814 A1* | 9/2002 | Uchida | H01L 51/5237 313/483 |
| 2008/0030484 A1* | 2/2008 | Cho | G06F 3/0412 345/176 |
| 2012/0327350 A1* | 12/2012 | Chang | G02F 1/133371 349/139 |
| 2013/0050595 A1* | 2/2013 | Kang | G02F 1/133371 349/15 |
| 2013/0050606 A1 | 2/2013 | Kang | |
| 2014/0049706 A1* | 2/2014 | Park | G02B 27/22 349/15 |
| 2014/0152926 A1* | 6/2014 | Takahashi | G02B 27/2214 349/15 |
| 2015/0219911 A1* | 8/2015 | Cho | G02F 1/1393 349/15 |

FOREIGN PATENT DOCUMENTS

| | | |
|---|---|---|
| CN | 103018979 A | 4/2013 |
| CN | 103235462 A | 8/2013 |
| CN | 103901694 | 7/2014 |
| CN | 105278175 | 1/2016 |
| CN | 105446013 A | 3/2016 |
| CN | 105607381 | 5/2016 |
| JP | 2009186935 A | 8/2009 |

* cited by examiner

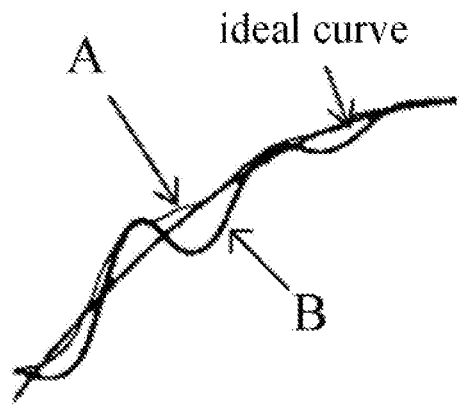
Fig. 6
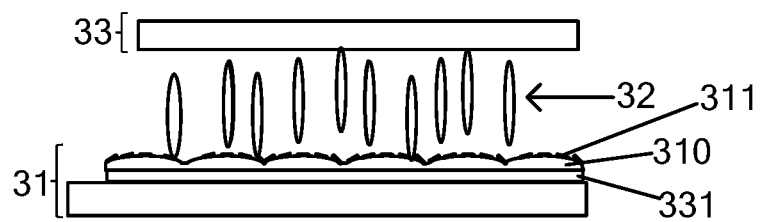
Fig. 7
| forming a first substrate and a second substrate, wherein a first electrode and a second electrode for driving liquid crystals to achieve a curved display effect are formed on the first substrate and the second substrate | — 101 |
| aligning the substrates and perfusing liquid crystals | — 102 |
Fig. 8

LIQUID CRYSTAL LENS, MANUFACTURING METHOD THEREOF AND CURVED DISPLAY DEVICE

The present application is the U.S. national phase entry of PCT/CN2017/070732, with an international filing date of Jan. 10, 2017, which claims the benefit of Chinese Patent Application No. 201610202960.5, filed on Apr. 1, 2016, the entire disclosures of which are incorporated herein by reference.

FIELD

This disclosure relates to the field of display, and in particular to a liquid crystal lens, a manufacturing method thereof and a corresponding curved display device.

BACKGROUND ART

In conventional curved display, a display device is physically manufactured in a curved or bended shape, so as to have all different positions of the display device to face human eyes, thereby obtaining an optimal viewing angle experience. However, such a bended design can only make a user located in a central viewing position feel comfortable. A viewer cannot achieve a similar effect when located in other viewing positions. Also, the central viewing position is usually not adjustable upon actual needs. Besides, the display device manufactured in a curved or bended shape often needs to occupy large physical space, which is limited to a certain degree in actual applications, especially in domestic applications.

SUMMARY

This disclosure provides a liquid crystal lens, a manufacturing method thereof, and a corresponding curved display device, for solving problems such as an impaired curved display effect resulting from unsmoothness of the electric field strength curve in an existing liquid crystal lens for curved display.

Specifically, an embodiment of this disclosure provides a liquid crystal lens, which is configured to be adhered over a flat display device for achieving curved display. The liquid crystal lens includes liquid crystals, a first electrode and a second electrode for driving the liquid crystals, and an elevation layer. The first electrode comprises a plurality of independent electrodes separate from each other, each independent electrode being arranged on the elevation layer. Further, the elevation layer is configured such that each independent electrode is located in a different position along a thickness direction of the elevation layer. When each independent electrode is located in a different position along a longitudinal direction, variations in refractive indexes of the liquid crystals in each position will become smoother.

In certain exemplary embodiments, the elevation layer comprises a plurality of bumps. Furthermore, one or more independent electrodes are arranged on one bump. Further in certain exemplary embodiments, a bump corresponds to a pixel region of the flat display device.

According to certain embodiments, the independent electrode can be in a strip shape or a dot shape. Besides, a surface of the bump is a convex surface. Furthermore, the elevation layer is made of a resin material.

In certain exemplary embodiments, the liquid crystal lens includes a first substrate and a second substrate aligned with each other. The first electrode and a thin film transistor for controlling loading of signals onto the first electrode are disposed on the first substrate, and the second electrode is disposed on the second substrate.

In certain exemplary embodiments, the liquid crystal lens includes a first substrate and a second substrate aligned with each other. The first electrode, the second electrode and a thin film transistor for controlling loading of signals onto the first electrode are all disposed on the first substrate. Besides, the first electrode and the second electrode are insulated from each other.

Certain embodiments of this disclosure further provides a curved display device, comprising the liquid crystal lens according to any of the above embodiments.

Furthermore, the curved display device further comprises a display panel. The liquid crystal lens is disposed peripherally over a light exit side of the display panel. In certain embodiments, the liquid crystal lens and a color filter substrate of the display panel can share a substrate.

Certain embodiments of this disclosure further provides a manufacturing method for a liquid crystal lens. Specifically, the method comprises: forming a first substrate and a second substrate; forming on the first substrate and the second substrate a first electrode and a second electrode for driving liquid crystals to achieve curved display, wherein the first electrode comprises a plurality of independent electrodes separate from each other; and aligning the substrates and perfusing liquid crystals. The method further comprises forming an elevation layer. Specifically, according to the manufacturing method, each independent electrode is disposed on the elevation layer, and the elevation layer is further formed such that each independent electrode is located in a different position along a thickness direction of the elevation layer. Furthermore, the manufacturing method further comprises: obtaining a thickness of the elevation layer at various positions by the following: optimizing a relative height of various electrodes, wherein a standard for the optimization is to enable the refractive indexes of the liquid crystals in various positions to vary smoothly so as to meet requirements of curved display; and determining a thickness of the elevation layer in a position corresponding to each electrode based on the relative height of each electrode.

The existing liquid crystal lens for achieving a curved display effect comprises: liquid crystals, as well as a first electrode and a second electrode for driving the liquid crystals to achieve curved display. Specifically, one of the first electrode and the second electrode is generally a plurality of independent electrodes separate from each other, and the other is a plate electrode. Besides, the first electrode and the second electrode are both located in respective planes (which planes are parallel with the substrates separately). It has been found by the inventors that in positions between independent electrodes, the electric field is comparatively weak. This results in fluctuations in the refractive index of the liquid crystals in these positions, and thus does not meet the ideal requirement of smooth variation in the refractive index as desired by curved display, as shown in FIG. 2. This disclosure provides a novel liquid crystal lens, a manufacturing method thereof and a corresponding curved display device. By arranging an elevation layer, unsmooth variation in the refractive index caused by a weaker electric field between independent electrodes can be improved. Furthermore, during specific implementations, this is usually achieved by optimizing the elevation layer through simulation experiments. Based on that, the unsmooth variation in the refractive index caused by a weaker electric field between independent electrodes is alleviated, and the curved display effect is improved.

BRIEF DESCRIPTION OF DRAWINGS

In order to illustrate the technical solutions in the embodiments of this disclosure more clearly, drawings to be used in these embodiments will be introduced briefly as follows. Apparently, the drawings in the depictions as follows are only some embodiments of this disclosure. For those having ordinary skills in the art, other embodiments can be further obtained from these drawings without any inventive efforts.

FIG. 6 is a schematic view for a curve of liquid crystal delay amount in various positions of a liquid crystal lens provided in an embodiment of this disclosure;

FIG. 7 is a schematic section view of a further liquid crystal lens provided in an embodiment of this disclosure; and FIG. 8 is a flow diagram for a manufacturing method of a liquid crystal lens provided in an embodiment of this disclosure.

DETAILED DESCRIPTION OF EMBODIMENTS

Figure 1:
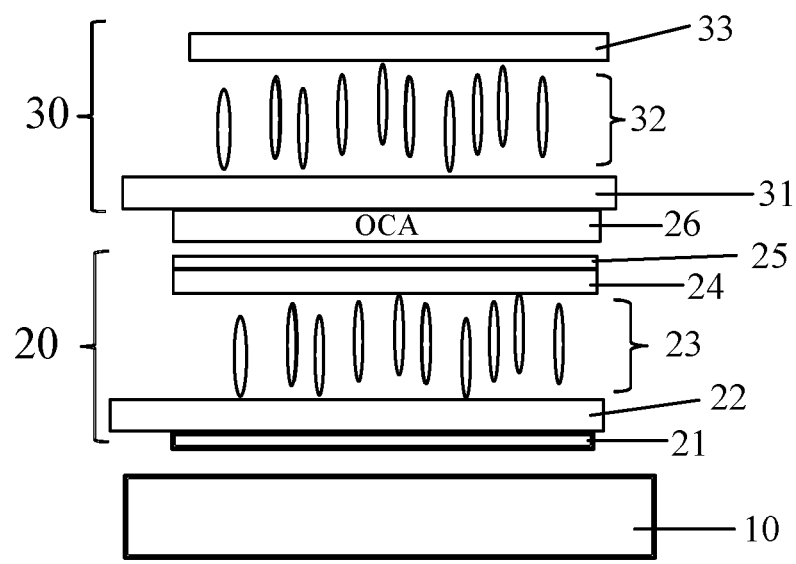
FIG. 1 is a schematic structure view of an existing curved display device.

The technical solutions in the embodiments of this disclosure will be described below clearly and completely with reference to the drawings. Apparently, the described embodiments are only part of the embodiments of this disclosure, instead of all. Based on the embodiments of this disclosure, all other embodiments, obtainable by those having ordinary skills in the art without inventive efforts, shall fall within the protection scope of this disclosure.

In the drawings, components involved in the embodiments of this disclosure are indicated by the following reference signs. Specifically: 10—backlight module, 20—display panel, 30—liquid crystal lens, 26—optical clear adhesive, 21—lower polarizer, 22—array substrate, 23—liquid crystal, 24—color filter substrate, 25—upper polarizer, 31—first substrate, 32—liquid crystal, 33—second substrate, 310—elevation layer, 311—first electrode, 312—bump, 313—independent electrode, and 331—second electrode.

Figure 2:
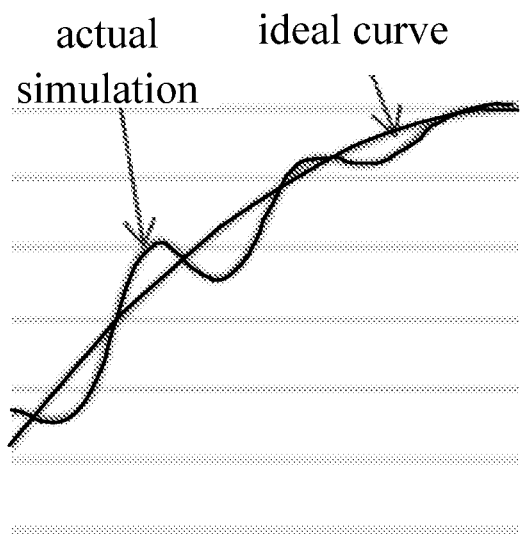
FIG. 2 is a schematic view illustrating a comparison between a simulated curve of liquid crystal delay amount in various positions and an ideal curve desired by curved display.

At present, a flat display device can be considered for achieving a curved display effect and adjustability of the central viewing position. A possible way is shown in FIG. 1, where a liquid crystal lens 30 is added in front of a display device 20, and the liquid crystal lens 30 comprises electrodes and liquid crystals 32. By applying different voltages to the electrodes for control over refractive indexes of the liquid crystals in corresponding positions, the goal of bending light can be achieved, and thereby the curved display is finally obtained, with the central viewing position being intelligently adjustable. However, in actual designs, it has been found that electric fields are unsmooth between various driving voltages as shown in FIG. 2 specifically. In other words, an electric field strength curve as actually simulated is not an ideal curve desired by the designs, which affects the curved display effect.

Figure 3:
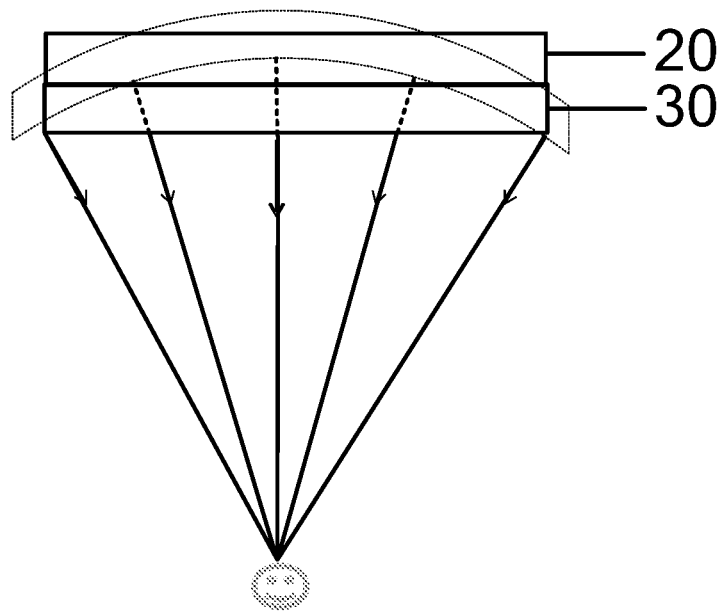
FIG. 3 is a schematic view illustrating principles of a curved display device provided in an embodiment of this disclosure.

This disclosure relates to a liquid crystal lens, which is in a planar shape and adhered over a flat display device such that the display device achieves a curved display effect. As shown in FIG. 3, a liquid crystal lens 30 is adhered over a display panel 20, and achieves an equivalent effect of a curved display device together with the display panel 20. The equivalent curved display device is indicated by dashed lines in FIG. 3.

A liquid crystal lens comprises liquid crystals, a first electrode and a second electrode for driving the liquid crystals to achieve a curved display effect, as well as an elevation layer. It is known that different deflection states of liquid crystal correspond to different refractive indexes. In the liquid crystal lens, one of the first electrode and the second electrode is generally a plurality of independent electrodes separate from each other, and the other is a plate electrode. By applying suitable driving voltages to the first electrode and the second electrode, a curve of smooth variation in the refractive index along various positions of the curved can be obtained theoretically. This meets the requirements for curved display; see an ideal curve in FIG. 6. However, in actual implementations, the electric field is comparatively weak in positions between the independent electrodes, which easily results in unsmooth variation in the refractive index, see curve B in FIG. 6.

The horizontal axis in FIG. 6 indicates length, which generally takes a transversal direction of the display device, and the vertical axis indicates liquid crystal delay amount, thereby forming a curve of LC profile driving the liquid crystals. The ideal curve in FIG. 6 is a curve desired by the liquid crystal lens and designed to achieve the curved display effect. In this figure, curve B is a simulation drawing of an actual delay amount of the existing liquid crystal lens, while curve A is a simulation drawing of delay amount of the liquid crystal lens according to the embodiments of this disclosure. It is known that different deflection states of liquid crystal correspond to different LC profiles, and thus correspond to different refractive indexes. Therefore, the variation in the refractive index can be seen indirectly from FIG. 6. For convenience in depiction and understanding, it is directly expressed by using refractive index herein.

Based on that, an embodiment of this disclosure provides a liquid crystal lens configured to be adhered over a flat display device for achieving a curved display effect. The liquid crystal lens can comprise: liquid crystals, a first electrode and a second electrode for driving the liquid crystals to achieve a curved display effect, as well as an elevation layer. Specifically, one of the first electrode and the second electrode comprises a plurality of independent electrodes separate from each other, each independent electrode being arranged on the elevation layer. Besides, the elevation layer is further configured such that each independent electrode is located in a different position along a thickness direction of the elevation layer.

In this embodiment, one of the first electrode and the second electrode is generally a plurality of independent electrodes separate from each other, and the other is a plate electrode. No matter whether the independent electrodes or the plate electrode is disposed on the elevation layer, unsmooth variation in the refractive index caused by a weaker electric field between independent electrodes, and thereby the curved display effect, can be improved. The elevation layer in this embodiment will not be specifically limited, as long as it can improve the unsmooth variation in the refractive index caused by a weaker electric field between independent electrodes. In specific implementation, the elevation layer is generally optimized through simulation experiments, which will be described in detail in a manufacturing method of a liquid crystal lens below. Referring to curve A in FIG. 6, it shows a schematic view for refractive index of the liquid crystal lens which is improved by using the elevation layer. As can be seen from the drawing, fluctuations in the refractive index are weakened after improvement by using the elevation layer, and become closer to the ideal curve desired by curved display.

In certain exemplary embodiments, the first electrode is a plurality of independent electrodes separate from each other, and each independent electrode is arranged on the elevation layer. Besides, the elevation layer is formed such that the independent electrodes are staggered up and down and not located in a same plane, thus enabling the refractive indexes of the liquid crystals in various positions to vary smoothly. Likewise, the elevation layer will not be specifically limited, and it can be optimized through simulation experiments in specific implementations. The independent electrode here refers to an electrode capable of being driven independently. In this way, the liquid crystals in a corresponding position can be controlled independently, so as to achieve the refractive indexes desired by curved display. Specifically, the independent electrode is usually in a strip shape or a dot shape.

Figure 4:
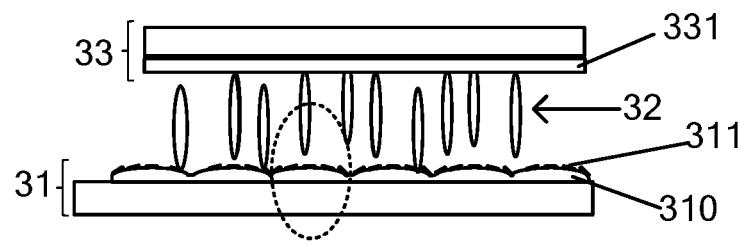
FIG. 4 is a schematic section view of a liquid crystal lens provided in an embodiment of this disclosure.
Figure 5:
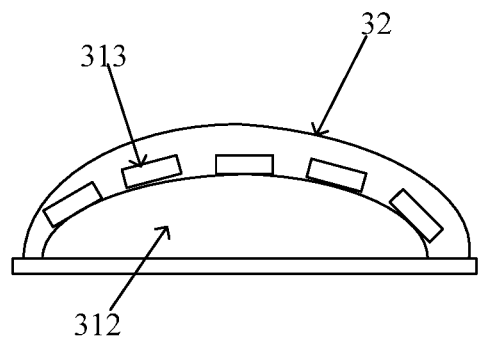
FIG. 5 is an enlarged schematic view for a part of the liquid crystal lens in FIG. 4.

Specifically, an optional implementation is shown in FIGS. 4-5, where FIG. 4 is the liquid crystal lens provided in this embodiment and FIG. 5 is an enlarged view for a part of the liquid crystal lens in FIG. 4. Besides, FIG. 5 also shows the arrangement of the independent elements on a bump. Now, the liquid crystal lens can comprise a first substrate 31 and a second substrate 33 aligned with each other as well as liquid crystals 32. A first electrode 311 and a thin film transistor for controlling loading of signals onto the first electrode 311 are disposed on the first substrate 31, and a second electrode 331 is disposed on the second substrate 33. The first substrate 31 is further provided with an elevation layer 310. The elevation layer 310 comprises a plurality of bumps 312. The first electrode 311 comprises a plurality of independent electrodes 313 separate from each other, and the independent electrodes 313 are arranged on a convexly curved surface of the bumps 312. In addition, the liquid crystals 32 are arranged over the independent electrodes 313 along the curved surface as shown in FIG. 5 specifically. Furthermore, the bumps 312 on the elevation layer 310 are optimized in advance through simulation experiments. In this case, a standard of the optimization is to enable the refractive indexes of the liquid crystals in various positions to vary smoothly, so as to meet the requirements of curved display.

A curve of transmittance for an optimized liquid crystal lens with the above structure is indicated by curve A in FIG. 6. As compared with curve B, which differs from the liquid crystal lens corresponding to curve A merely in the absence of the elevation layer 310 and the arrangement of the independent electrodes in a plane, fluctuations in the refractive index are weakened, which becomes closer to the ideal curve desired by curved display. Moreover, as shown in FIG. 5 and above, the elevation layer 310 in this simulation optimization design has the structure as shown in FIGS. 4 and 5. That is, the elevation layer 310 comprises a plurality of bumps 312 which are in a convex state as shown in FIG. 5. Besides, the independent electrodes 313 are arranged on a convexly curved surface. However, those skilled in the art can understand that, theoretically, problems such as unsmooth variation in the refractive index not meeting the requirements of curved display resulting from the drastic fluctuations in the refractive index caused by a weaker electric field between independent electrodes 313 can be improved, as long as the independent electrodes 313 are not arranged in a same plane.

The independent electrode 313 can be a slit electrode used in a liquid crystal display and being hollow in the middle, or a strip or dot electrode. The second electrode 331 is generally a plate electrode, but an independent electrode is also possible.

As shown in FIG. 7, in another optional implementation, the second electrode 331 is also disposed on the first substrate 31. It can be understood that the second electrode 331 and the first electrode 311 are insulated from each other. This insulation can be implemented via the elevation layer 310, or an additional insulating layer, which will not be limited. The second electrode 331 is disposed under the first electrode 311 and spaced therefrom via the insulating layer. Except for that, this implementation is basically similar to the former.

In certain exemplary embodiments, the elevation layer can be made of a resin material. Besides, specific shapes of the elevation layer can be formed by photolithography or laser engraving.

It should be noted that in this embodiment, the liquid crystal lens can further comprise other films required for achieving a lens function, for example, an anchor layer for the liquid crystals. Since these films are not directly related to the technical problem solved by the present application, they will not be illustrated one by one here. Those skilled in the art can understand that the plurality of independent electrodes can be arranged on a same bump, or each independent electrode can be distributed on a bump respectively, as long as the refractive indexes are enabled to vary smoothly so as to meet the requirements for curved display. Besides, in certain exemplary embodiments, the size of the bump is in a pixel scale, i.e., a bump corresponds to one or several pixel regions of the display device. In addition, it is known that the pixel region is a region defined by data lines and gate lines intersecting each other.

The liquid crystal lens provided in this embodiment greatly increases the possibility of providing curved display by an ordinary flat display device. Moreover, by arranging an elevation layer, unsmooth variations in the refractive index caused by a weaker electric field between independent electrodes are further improved, and thereby a better curved display effect is enabled.

An embodiment of this disclosure further provides a curved display device, comprising any liquid crystal lens mentioned above. The curved display device can be a flat device, which can also achieve a curved display effect. Besides, since the liquid crystal lens is provided with an elevation layer and unsmooth variations in the refractive index caused by a weaker electric field between independent electrodes are improved, a better curved display effect can be achieved. Such a curved display device can be any product or component having a display function such as but not limited to, electronic paper, a handset, a tablet computer, a television, a display, a notebook computer, a digital photo frame and a navigator.

The curved display device provided in this embodiment can further comprise: a display panel and a liquid crystal lens. The display panel can be either a liquid crystal display panel, or an OLED display panel, which will not be limited here.

In addition, the liquid crystal lens can be disposed peripherally on a light exit side of the display panel as shown in FIG. 1 specifically. The curved display device according to the embodiments of this disclosure comprises a backlight module 10, a display panel 20 (for example, a liquid crystal display panel) and a liquid crystal lens 30 sequentially from below. The liquid crystal lens 30 is adhered on the display panel 20 via an optical clear adhesive 26. The display panel comprises a lower polarizer 21, an array substrate 22, liquid crystals 23, a color filter substrate and an upper polarizer 25 sequentially from below. The liquid crystal lens can also share a substrate with a color filter substrate of the display panel. In other words, separate steps for forming a liquid crystal lens on an upper surface of the substrate and forming a color filter substrate on a lower surface are omitted, which helps to save raw materials and thin the curved display device. An embodiment of this disclosure further provides a manufacturing method for the liquid crystal lens above. The manufacturing method is substantially similar to that of the existing liquid crystal lens, and the only difference is in that a process of forming an elevation layer is added. With such an elevation layer, unsmooth variations in the refractive index caused by a weaker electric field between independent electrodes can be improved, and thereby a better curved display effect can be achieved. Specifically as shown in FIG. 7, the manufacturing method comprises: step S101, forming a first substrate and a second substrate, and forming on the first substrate and the second substrate a first electrode and a second electrode for driving liquid crystals to achieve a curved display effect, wherein one of the first electrode and the second electrode comprises a plurality of independent electrodes; and step S102, aligning the substrates and perfusing liquid crystals. The first electrode and the second electrode can be located on different substrates respectively. The manufacturing method according to the embodiments of this disclosure differs from the prior art in that, it further comprises a process of forming an elevation layer. The independent electrodes of one of the first electrode and the second electrode are arranged on the elevation layer. Besides, the elevation layer is further configured such that each independent electrode is located in a different position along a thickness direction of the elevation layer, so as to enable the refractive indexes of the liquid crystals in each position to vary smoothly.

In the manufacturing method of a liquid crystal lens provided in this embodiment, by arranging an elevation layer, unsmooth variations in the refractive index caused by a weaker electric field between independent electrodes are improved, and a better curved display effect is achieved. Furthermore, in the manufacturing method, in order to obtain a thickness of the elevation layer in each position, the elevation layer is designed in advance by the following: optimizing a relative height of each electrode, wherein a standard of the optimization is to enable the refractive indexes of the liquid crystals in each position to vary smoothly so as to meet the requirements of curved display; and determining a thickness of the elevation layer in a position corresponding to each electrode based on the relative height of each electrode.

In specific embodiment, firstly, an ideal curve of the refractive index desired by curved display is obtained based on the design requirements, see the ideal curve as shown in FIG. 6. Secondly, suitable driving voltages are applied to the first electrode and the second electrode through computer simulation experiments, such that the refractive indexes of the liquid crystals in each position meet the requirements of curved display, i.e., to be as close to the ideal curve of the refractive index in the above step as possible, see curve B in FIG. 6. Then, a relative height of each electrode is optimized, wherein a standard of the optimization is to enable the refractive indexes of the liquid crystals in each position to vary smoothly so as to weaken the fluctuations and further approximate the ideal curve, thereby meeting the requirements of curved display, see curve A in FIG. 6. By optimizing the elevation layer, the unsmoothness caused by a weaker electric field between independent electrodes is alleviated, and thus the curved display effect is improved.

What is described above is only specific embodiments of this disclosure, but the protection scope of this disclosure is not limited thereto. Any variation or substitution easily conceivable within the technical field disclosed in this disclosure for a skilled person who is familiar with this technical field shall fall within the protection scope of this disclosure. Therefore, the protection scope of this disclosure shall be subject to the protection scope of the claims.

The invention claimed is:

1. A liquid crystal lens configured to be adhered over a flat display device for achieving curved display, the liquid crystal lens comprising:
    liquid crystals,
    a first electrode and a second electrode for driving the liquid crystals, and
    an elevation layer made of a resin material, wherein
    the first electrode comprises a plurality of independent electrodes separate from each other, each independent electrode being arranged on the elevation layer, and
    the elevation layer is further configured such that each independent electrode is located in a different position along a thickness direction of the elevation layer, wherein
    the elevation layer comprises a plurality of bumps,
    a surface, facing the liquid crystals, of the bump is a convex surface, and
    more than one independent electrodes are arranged only on the convex surface of one bump.

2. The liquid crystal lens according to claim 1, wherein a bump corresponds to a pixel region of the flat display device.

3. The liquid crystal lens according to claim 1, wherein the independent electrode is in a strip shape or a dot shape.

4. The liquid crystal lens according to claim 1, wherein the liquid crystal lens further comprises: a first substrate and a second substrate aligned with each other, wherein the first electrode and a thin film transistor for controlling loading of signals onto the first electrode are disposed on the first substrate, and the second electrode is disposed on the second substrate.

5. The liquid crystal lens according to claim 1, wherein the liquid crystal lens further comprises: a first substrate and a second substrate aligned with each other, wherein the first electrode, the second electrode and a thin film transistor for controlling loading of signals onto the first electrode are all disposed on the first substrate, and the first electrode and the second electrode are insulated from each other.

6. A curved display device, comprising:
    a liquid crystal lens comprised of:
    liquid crystals;
    a first electrode and a second electrode for driving the liquid crystals;
    an elevation layer made of a resin material, wherein the first electrode comprises a plurality of independent electrodes separate from each other, each independent electrode being arranged on the elevation layer, the elevation layer is further configured such that each independent electrode is located in a different position along a thickness direction of the elevation layer, wherein the elevation layer comprises a plurality of bumps, and a surface of the bump is a convex surface; and a display panel, wherein the liquid crystal lens is disposed over a light exit side of the display panel.

7. The curved display device according to claim 6, wherein the liquid crystal lens and a color filter substrate of the display panel share a substrate.

8. A manufacturing method for a liquid crystal lens, comprising:

forming a first substrate and a second substrate, forming, on the first substrate and the second substrate, a first electrode and a second electrode for driving liquid crystals to achieve curved display, wherein the first electrode comprises a plurality of independent electrodes separate from each other, aligning the substrates and perfusing liquid crystals, and forming an elevation layer, wherein each independent electrode is disposed on the elevation layer, and the elevation layer is further formed such that each independent electrode is located in a different position along a thickness direction of the elevation layer, wherein the elevation layer comprises a plurality of bumps, a surface, facing the liquid crystals, of the bump is a convex surface, and more than one independent electrodes are arranged only on the convex surface of one bump.

9. The curved display device according to claim 6, wherein a bump corresponds to a pixel region of the flat display device.

10. The curved display device according to claim 6, wherein the independent electrode is in a strip shape or a dot shape.

11. The curved display device according to claim 6, wherein the liquid crystal lens further comprises: a first substrate and a second substrate aligned with each other, wherein the first electrode and a thin film transistor for controlling loading of signals onto the first electrode are disposed on the first substrate, and the second electrode is disposed on the second substrate.

12. The curved display device according to claim 6, wherein the liquid crystal lens further comprises: a first substrate and a second substrate aligned with each other, wherein the first electrode, the second electrode and a thin film transistor for controlling loading of signals onto the first electrode are all disposed on the first substrate, and the first electrode and the second electrode are insulated from each other.

\* \* \* \* \*